United States Patent
Biswas et al.

(10) Patent No.: US 9,559,891 B2
(45) Date of Patent: Jan. 31, 2017

(54) SYSTEM AND METHOD FOR HOSTED NETWORK MANAGEMENT

(71) Applicant: Cisco Technology, Inc., San Jose, CA (US)

(72) Inventors: Sanjit Biswas, San Francisco, CA (US); John Bicket, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 546 days.

(21) Appl. No.: 14/089,341

(22) Filed: Nov. 25, 2013

(65) Prior Publication Data
US 2014/0156824 A1    Jun. 5, 2014

Related U.S. Application Data

(63) Continuation of application No. 12/039,509, filed on Feb. 28, 2008, now Pat. No. 8,595,357.
(Continued)

(51) Int. Cl.
*G06F 15/173* (2006.01)
*H04L 12/24* (2006.01)
(Continued)

(52) U.S. Cl.
CPC ........... *H04L 41/04* (2013.01); *H04L 29/1232* (2013.01); *H04L 41/0246* (2013.01);
(Continued)

(58) Field of Classification Search
CPC ...... H04L 41/04; H04L 41/0803; H04L 41/22; H04L 61/2092; H04L 41/0246; H04L 29/1232; H04L 29/12226; H04L 29/12839; H04L 41/026; H04L 61/2015; H04L 61/6022; H04L 12/24; H04W 8/005; H04W 8/26; H04W 48/16; H04W 84/12; H04W 88/08; H04W 88/16
See application file for complete search history.

(56) References Cited

U.S. PATENT DOCUMENTS 5,796,739 A    8/1998    Kim et al.
6,049,602 A    4/2000    Foladare et al.
(Continued)

FOREIGN PATENT DOCUMENTS

EP    1265397 A2    12/2002
EP    1473900 A2    11/2004
(Continued)

OTHER PUBLICATIONS

International Preliminary Report on Patentability, Application No. PCT/US2008/055419, dated Sep. 1, 2009, 7 pages.
(Continued)

*Primary Examiner* — Cheikh Ndiaye
(74) *Attorney, Agent, or Firm* — Polsinelli PC

(57) ABSTRACT

A hosted network management solution for communications over a computer network supports data communication across a network in accordance with a network message protocol such that communications are established between a network host and a node device. The and the node device performs a self-configuring operation in which the network host identifies a network owner associated with the hosted network, and maintains a persistent network connection path between the network host and the node device for the exchange of network packet messages. The network host retrieves message data from the network packet messages it receives from the node device and performs network management operations to provide a user management interface to the identified network owner. The hosted network management enables more convenient setup and configuration
(Continued)

for the network owner and provides more complete and effective network management tools.

17 Claims, 8 Drawing Sheets

Related U.S. Application Data

(60) Provisional application No. 60/892,432, filed on Mar. 1, 2007, provisional application No. 60/892,437, filed on Mar. 1, 2007, provisional application No. 60/892,449, filed on Mar. 1, 2007, provisional application No. 60/892,443, filed on Mar. 1, 2007, provisional application No. 60/892,440, filed on Mar. 1, 2007.

(51) Int. Cl.
*H04W 8/00* (2009.01)
*H04W 8/26* (2009.01)
*H04L 29/12* (2006.01)
*H04W 48/16* (2009.01)
*H04W 84/12* (2009.01)
*H04W 88/08* (2009.01)
*H04W 88/16* (2009.01)

(52) U.S. Cl.
CPC .......... *H04L 41/0803* (2013.01); *H04L 41/22* (2013.01); *H04L 61/2092* (2013.01); *H04W 8/005* (2013.01); *H04W 8/26* (2013.01); *H04L 29/12226* (2013.01); *H04L 29/12839* (2013.01); *H04L 41/026* (2013.01); *H04L 61/2015* (2013.01); *H04L 61/6022* (2013.01); *H04W 48/16* (2013.01); *H04W 84/12* (2013.01); *H04W 88/08* (2013.01); *H04W 88/16* (2013.01)

(56) References Cited

U.S. PATENT DOCUMENTS

| | | | |
|---|---|---|---|
| 6,324,577 B1* | 11/2001 | Hirai | H04L 12/24 370/254 |
| 6,704,301 B2 | 3/2004 | Chari et al. | |
| 6,728,232 B2 | 4/2004 | Hasty et al. | |
| 6,832,085 B1* | 12/2004 | McDonagh | H04W 24/00 455/423 |
| 6,868,080 B1 | 3/2005 | Umansky et al. | |
| 6,917,626 B1 | 7/2005 | Duvvury | |
| 6,925,069 B2 | 8/2005 | Koos, Jr. et al. | |
| 7,016,328 B2 | 3/2006 | Chari et al. | |
| 7,082,464 B2* | 7/2006 | Hasan | H04L 41/0213 709/202 |
| 7,444,158 B2 | 10/2008 | Shitama et al. | |
| 7,508,799 B2 | 3/2009 | Sumner et al. | |
| 7,526,538 B2 | 4/2009 | Wilson | |
| 7,554,959 B1 | 6/2009 | Dowling | |
| 7,562,393 B2 | 7/2009 | Buddhikot et al. | |
| 7,583,695 B2 | 9/2009 | Vimpari et al. | |
| 7,590,733 B2 | 9/2009 | Lum | |
| 7,630,341 B2 | 12/2009 | Buddhikot et al. | |
| 7,640,325 B1* | 12/2009 | DeKoning | G06F 3/0605 709/201 |
| 7,650,148 B2 | 1/2010 | Kim et al. | |
| 7,729,314 B2 | 6/2010 | Siddiqi et al. | |
| 7,760,695 B2* | 7/2010 | Gopalakrishnan | H04L 41/082 370/338 |
| 7,881,267 B2 | 2/2011 | Crosswy et al. | |
| 8,543,673 B2* | 9/2013 | Calippe | H04L 41/0843 709/221 |
| 2001/0024953 A1 | 9/2001 | Balogh | |
| 2002/0006788 A1 | 1/2002 | Knutsson et al. | |
| 2002/0141390 A1 | 10/2002 | Fangman et al. | |
| 2003/0084162 A1 | 5/2003 | Johnson et al. | |
| 2003/0095520 A1 | 5/2003 | Aalbers et al. | |
| 2003/0142641 A1 | 7/2003 | Sumner et al. | |
| 2003/0169713 A1 | 9/2003 | Luo | |
| 2003/0179750 A1 | 9/2003 | Hasty et al. | |
| 2004/0141522 A1 | 7/2004 | Texerman et al. | |
| 2004/0253970 A1 | 12/2004 | Kunihiro | |
| 2004/0264395 A1 | 12/2004 | Rao | |
| 2005/0059396 A1 | 3/2005 | Chuah et al. | |
| 2005/0060364 A1 | 3/2005 | Kushwaha et al. | |
| 2005/0073970 A1* | 4/2005 | Davidson | H04W 24/00 370/328 |
| 2005/0229238 A1 | 10/2005 | Ollis et al. | |
| 2005/0246769 A1 | 11/2005 | Bao et al. | |
| 2005/0259698 A1 | 11/2005 | Griffin et al. | |
| 2006/0009246 A1 | 1/2006 | Marinier et al. | |
| 2006/0014562 A1 | 1/2006 | Syrtsov et al. | |
| 2006/0015579 A1 | 1/2006 | Sastri et al. | |
| 2006/0053216 A1 | 3/2006 | Deokar et al. | |
| 2006/0089964 A1 | 4/2006 | Pandey et al. | |
| 2006/0155833 A1 | 7/2006 | Matsuda et al. | |
| 2006/0187873 A1 | 8/2006 | Friday et al. | |
| 2006/0200543 A1 | 9/2006 | Kong et al. | |
| 2006/0209714 A1 | 9/2006 | Ackermann-Markes et al. | |
| 2006/0291443 A1 | 12/2006 | Harrington et al. | |
| 2007/0002833 A1* | 1/2007 | Bajic | H04L 29/1282 370/352 |
| 2007/0019631 A1 | 1/2007 | Jang | |
| 2007/0064661 A1 | 3/2007 | Sood et al. | |
| 2007/0156813 A1 | 7/2007 | Galvez et al. | |
| 2007/0226358 A1* | 9/2007 | Krywaniuk | H04L 12/24 709/229 |
| 2007/0253344 A1 | 11/2007 | Frost et al. | |
| 2007/0276926 A1 | 11/2007 | LaJoie et al. | |
| 2007/0286393 A1 | 12/2007 | Roever et al. | |
| 2008/0056223 A1* | 3/2008 | Manser | H04L 12/66 370/342 |
| 2008/0095180 A1 | 4/2008 | Vucina et al. | |
| 2008/0205415 A1 | 8/2008 | Morales | |
| 2008/0225806 A1 | 9/2008 | Arian et al. | |
| 2009/0176509 A1 | 7/2009 | Davis et al. | |
| 2010/0260061 A1 | 10/2010 | Bojahra et al. | |
| 2010/0265845 A1 | 10/2010 | Lampen | |
| 2011/0029644 A1 | 2/2011 | Gelvin et al. | |

FOREIGN PATENT DOCUMENTS

| | | |
|---|---|---|
| WO | 03079709 A1 | 9/2003 |
| WO | 2006046261 A1 | 11/2006 |
| WO | 2006121465 A1 | 11/2006 |

OTHER PUBLICATIONS

International Search Report and Written Opinion, Application No. PCT/US2008/055419, dated Aug. 12, 2008, 13 pages.
International Preliminary Report on Patentability, Application No. PCT/US2008/055414, dated Sep. 1, 2009, 12 pages.
International Search Report and Written Opinion, Application No. PCT/US2008/055414, dated Oct. 14, 2008, 18 pages.
International Preliminary Report on Patentability, Application No. PCT/US2008/055415, dated Sep. 1, 2009, 7 pages.
International Search Report and Written Opinion, Application No. PCT/US2008/055415, dated Sep. 3, 2008, 12 pages.
International Preliminaly Report on Patentability, Application No. PCT/US2008/055416, dated Sep. 1, 2009, 6 pages.
International Search Report and Written Opinion, Application No. PCT/US2008/055416, dated Jul. 28, 2008, 9 pages.
International Preliminary Report on Patentability, Application No. PCT/US2008/055424, dated Sep. 1, 2009, 7 pages.
International Search Report and Written Opinion, Application No. PCT/US2008/055424, dated Aug. 19, 2008, 10 pages.
Non-Final Office Action, U.S. Appl. No. 12/039,539, dated Aug. 18, 2011, 18 pages.
Non-Final Office Action, U.S. Appl. No. 12/039,520, dated Aug. 17, 2011, 22 pages.

(56) References Cited

OTHER PUBLICATIONS

Final Office Action, U.S. Appl. No. 12/039,520, dated Feb. 1, 2011, 22 pages.
Non-Final Office Action, U.S. Appl. No. 12/039,520, dated Jun. 25, 2010, 19 pages.
Non-Final Office Action, U.S. Appl. No. 12/039,530, dated Sep. 1, 2009, 16 pages.
Notice of Allowance, U.S. Appl. No. 12/039,530, dated Jun. 22, 2010, 8 pages.
Notice of Allowance, U.S. Appl. No. 12/039,530, dated Aug. 5, 2010, 8 pages.
Non-Final Office Action, U.S. Appl. No. 12/039,557, dated Sep. 1, 2010, 18 pages.
Non-Final Office Action, U.S. Appl. No. 12/039,557, dated Jan. 5, 2012, 19 pages.
Final Office Action, U.S. Appl. No. 12/039,557, dated May 25, 2011, 14 pages.
Final Office Action, U.S. Appl. No. 12/039,520, dated Apr. 12, 2012, 20 pages.
Final Office Action, U.S. Appl. No. 12/039,539, dated Aug. 2, 2012, 22 pages.
Final Office Action, U.S. Appl. No. 12/039,557, dated Aug. 14, 2012, 16 pages.
Notice of Allowance, U.S. Appl. No. 12/039,520, dated Sep. 4, 2012, 10 pages.
RFC 2131, Dynamic Host Configuration Protocol, Mar. 1997, [online], Retrieved from the internet <tools.ietf.org/pdf/rfc2131.pdf>, pp. 1-46 as printed.
Bicket, John et al. "Architecture and Evaluation of an Unplanned 802.11 b Mesh Network", MobiCom'05, Aug. 28-Sep. 2, 2005, Cologne, Germany, pp. 1-12.
Buddhikot, M.M., et al. "Integration of Wireless LAN and 3G Wireless-Design and Implementation of a WLAN/CDMA2000 Interworking Architecture",IEEE Communications Magazine (Nov. 2003) vol. 41(11):99-100.
Caltech and Partners: "Application Monitoring API"[Online] Dec. 23, 2005 (Dec. 23, 2005), pp. 1-2, retrieved from the Internet at URL:http//monalisa.cacr.caltech.edu/monalisa_Service_Applications_ApMon.html> on Jul. 29, 2008.
"Changing Your MAC Address in Window XPNista, Linux and Mac OS X (Sometimes known as MAC spoofing)", retrieved from the Internet on Feb. 27, 2007 at [http://www.irongeek.com/i.php?page=security/changemac&mode=print], pp. 1-4.
Comer, D. Internetworking with TCPIIP (1995), Prentice Hall, USA, pp, 61-62, paragraph 4.5.
Congdon, P.(Hewlet Packard Company), et al. "IEEE 802.1X Remote Authentication Dial in User Service (RADIUS) Usage Guidelines", IEFT Standard, Internet Engineering Task Force (Sep. 2003) pp. 1-30.
Griffiths, Rob "Set newer portable Macs' sleep mode", posted at Macworld: MAC OS X Hints, on Oct. 19, 2006, retrieved from the Internet on Feb. 27, 2007 at [http://www.macworld.com/weblogs/macosxhints /2006/10/sleepmode/index.php?pf=1].
Konstantinou, A., "NetCallback 1.3.1 Forwarding TCP and UDP ports behind a firewall"[Online] 2001, pp. 1-5, retrieved from the Internet at URL:http://netcallback.sourceforge.net/> on Jul. 29, 2008.
Krag, Thomas, et al. "Wireless Mesh Networking", posted at Wireless DevCenter on Jan. 22, 2004, retrieved from the Internet at [http://www.oreillynet.com/Ipt/a/4535] on Feb. 27, 2007, pp. 1-9.
"No Internet With New Router, Computer, or Adapter: MAC Spoofing", posted at Netgear, retrieved from the Internet on Feb. 27, 2007 at [http://kbserver.netgear.com/kb_web_files/n101227.asp], p. 1.
Roch, Stephane "Nortel's Wireless Mesh Network solution: Pushing the boundaries of traditional WLAN technology", Norte/ Technical Journal (Jul. 2005) issue 2, pp. 18-23.
"The Linksys BEFSR41 Etherfast Cable/DLS Router" posted at Network Lab—A Guide to Networking An NTL Cable Modem, retrieved from the Internet on Feb. 27, 2007 at [http://www.networklab.co.uk.cmodem/linksys.html].
Wang, et al. "Global Connectivity for Mobile 1Pv6-based Ad Hoc Networks", Proceedings of the 19th International Conference on Advanced Information Networking and Applications (AINA '05) (Mar. 2005), vol. 2:807-812.

\* cited by examiner

| ? | name | hardware address | freshness | gateway | route metric | avg. latency ? | avg. tput ? | usage ? |
|---|---|---|---|---|---|---|---|---|
| ▷ | 1-20th near C-01 | 00:18:0a:01:08:61 | less than a minute ago | 1-PP Roof Gateway-03 | 3993 | 154.4 ms | N/A | 768.5 MB |
| ▷ | 1-Buffalo-04 | 00:18:0a:01:0d:8f | 5 minutes ago | 1-PP Roof Gateway-03 | 1723 | 225.3 ms | N/A | 6.3 MB |
| ▷ | 1-PP Roof Gateway-03 | 00:18:0a:01:08:63 | 4 minutes ago | self | 1 | 0.0 ms | N/A | 155.7 MB |
| ▷ | 1-casa 23 roof relay feed-05 | 00:18:0a:01:09:17 | less than a minute ago | 1-PP Roof Gateway-03 | 1825 | 140.2 ms | N/A | 225 KB |
| ▷ | 1-k22-02 | 00:18:0a:01:0c:68 | less than a minute ago | 1-PP Roof Gateway-03 | 1948 | 134.0 ms | N/A | 102 MB |
| ▷ | 2-23rd B St-16 | 00:18:0a:01:10:ed | 1 minute ago | 1-PP Roof Gateway-03 | 5688 | 168.9 ms | N/A | 156.2 MB |
| ▷ | 2-2430 B St-15 | 00:18:0a:01:09:0e | 3 minutes ago | 2-lc rooftop-07 | 23054 | 46.6 ms | 721.0 Kb/s | 83.8 MB |
| ▷ | 2-courtyard arch-06 | 00:18:0a:01:09:18 | less than a minute ago | 2-lc rooftop-07 | 1948 | 17.9 ms | N/A | 241.5 MB |
| ▷ | 2-gcwi roof-17 | 00:18:0a:01:0d:7d | 1 minute ago | 2-lc rooftop-07 | 2051 | 15.6 ms | N/A | 370.4 MB |
| ▷ | 2-lc rooftop-07 | 00:18:0a:01:08:6a | 5 minutes ago | self | 1 | 0.0 ms | N/A | 163.3 MB |
| ▷ | 3-Jay-08 | 00:18:0a:01:08:76 | 1 minute ago | 3-k26-09 | 4508 | 25.1 ms | N/A | 923.1 MB |
| ▷ | 3-k26-09 | 00:18:0a:01:08:6d | 1 minute ago | self | 1 | 0.0 ms | N/A | 325.3 MB |
| ▷ | 3-solar 27th-10 | 00:18:0a:01:08:64 | 2 minutes ago | 3-k26-09 | 3611 | 35.9 ms | N/A | 139.7 MB |

SYSTEM AND METHOD FOR HOSTED NETWORK MANAGEMENT

CROSS-REFERENCES TO RELATED APPLICATIONS

This application is a continuation of U.S. application Ser. No. 12/039,509, filed Feb. 28, 2008, entitled SYSTEM AND METHOD FOR HOSTED NETWORK MANAGEMENT, which claims the benefit of U.S. Provisional Application Ser. No. 60/892,432 entitled "System and Method For Hosted Network Management" by Sanjit Biswas et al., filed Mar. 1, 2007 and the benefit of the following U.S. Provisional Applications: entitled "Node Self-Configuration and Operation in a Wireless Network", by J. Bicket, et al., Ser. No. 60/892,437, filed Mar. 1, 2007; entitled "Client Operation for Network Access" by Thomer M. Gil et al., Ser. No. 60/892,440, filed Mar. 1, 2007; entitled "System and Method for Remote Monitoring and Control of Network Devices" by S. Biswas et al., Ser. No. 60/892,443, filed Mar. 1, 2007; entitled "Client Addressing and Roaming in a Wireless Network" by Thomer M. Gil et al., Ser. No. 60/892,449, filed Mar. 1, 2007. Priority of the filing dates is hereby claimed, and the disclosures of the Provisional Applications are hereby incorporated by reference.

BACKGROUND

Wireless mesh networks include at least one node that connects to a wide area network (WAN) and one or more wireless access points comprising nodes of the mesh network that communicate with each other, at least one of which communicates with the wide area network node. The WAN can comprise, for example, the Internet, and the WAN node typically comprises a cable interface (cable modem) or DSL interface or the like, and the wireless access points typically comprise wireless routers and the like. Wireless mesh network are convenient because they can be implemented with little or no effort to provide infrastructure. For example, it is generally not necessary to install additional cabling for access to the wide area network. Once a connection to the WAN is provided, the additional wireless access points can be configured to communicate and thereby provide network access whose geographic coverage is theoretically limited only by the distribution of the wireless access points of the mesh network.

In practical terms, network management of such mesh networks can be very complicated and can require a relatively high level of skill in network communications and protocols. A mesh network owner typically has ownership of the mesh network nodes and usually has responsibility for ensuring access to the WAN through the WAN node. The mesh network owner generally receives WAN access through a subscription arrangement with a provider, such as an Internet service provider (ISP). To initiate network communications with the WAN, the WAN node must be properly configured by the network owner with service parameters of the ISP. Once network access is established to the WAN, the network owner must configure each of the wireless access points. Such configuration is not a trivial task. The configuration process can involve knowledge of the hardware and software configuration of the mesh network devices, as well as familiarity with network configuration and addresses, security settings, network protocols, hardware configuration, encryption algorithms. Determining the needed information and determining the process for providing such information to appropriate vendors, and actually entering such information, can be complicated and time consuming.

Even after the mesh network has been set up and configured, the actual management and maintenance of the network can be even more complicated and time consuming. Clients that want to use the mesh network must be identified to the WAN node, allocated a network address, and initiate gaining access. The network nodes (routers) must be maintained for proper configuration and performance. Network conditions must be monitored for proper functioning and to identify performance issues, such as bandwidth availability and quality of service. Other management tasks, such as account management, user information, and access control and billing, must be performed.

A variety of network management tools are available to assist with the concerns described above. Conventional tools, however, generally address only limited aspects of the mesh network environment. A mesh network operator will need to identify a workable combination of such tools for all the network management tasks that must be performed and will need to install, configure, and implement the selected suite of tools for operation of the mesh network.

Thus, there is a need for more convenient setup, configuration, and maintenance of wireless mesh networks. The present invention satisfies this need.

SUMMARY

Disclosed herein is a hosted network management solution for communications over a computer network. Data is communicated across the network in accordance with a network message protocol. The solution involves establishing communications between a network host and a node device, wherein the node device performs a self-configuring operation in which the network host identifies a network owner associated with the hosted network, and maintaining a persistent network connection path between the network host and the node device for the exchange of network packet messages, wherein the network host retrieves message data from the network packet messages it receives from the node device and performs network management operations to provide a user management interface to the identified network owner. The hosted network management enables more convenient setup and configuration for the network owner and provides more complete and effective network management tools.

In another aspect, the hosted network management solution involves receiving a connection message from a node device at a network host, wherein the connection message comprises a request from the node device for a network address in a managed network, and determining if the requesting node device is associated with device registration data in the managed network that identifies a network owner and, if the requesting node device is a registered device, then returning a network address allocation message from the network host to the requesting node device, thereby self-configuring the node device for communications with the network host and establishing a hosted network associated with the identified network owner, and periodically receiving authentication messages from the node device at the network host such that the network host can determine a mapping of the network address to the registered device, and responding to the authentication message with an acknowledgement message that maintains a persistent network connection path from the network host to the node device, and then sending and receiving encapsulated packet messages between the network host and the node device, the encapsulated packet messages comprising packet messages of the message protocol appended with header information of the hosted network, wherein the network host retrieves message data from encapsulated packet messages it receives from the node device and performs network management operations to provide a user management interface to the identified network owner.

Other features and advantages of the present invention should be apparent from the following description of the preferred embodiments, which illustrate, by way of example, the principles of the invention.

BRIEF DESCRIPTION OF THE DRAWINGS

FIG. 2 is a screenshot representation of a management tool comprising a node page that is provided by the host illustrated in FIG. 1.

FIG. 5 is a management tool screenshot of a dashboard view provided by the host.

FIG. 6 is a management tool screenshot of a configuration view provided by the host.

DETAILED DESCRIPTION

Figure 1:
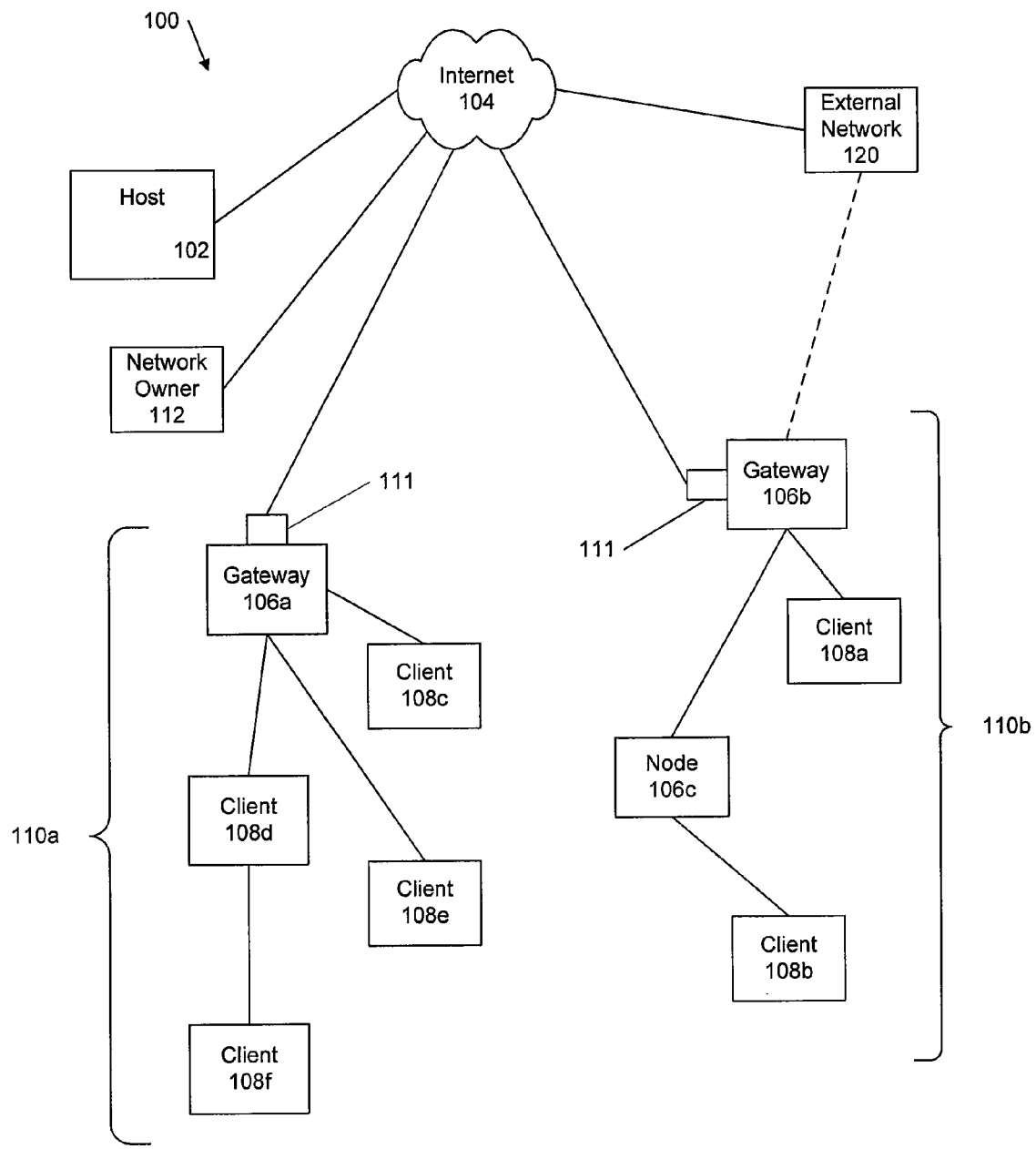
FIG. 1 is a block diagram representation of a hosted network 100 constructed in accordance with the invention.

FIG. 1 is a block diagram representation of a hosted network 100 constructed in accordance with the invention. The hosted network 100 includes a host 102 that communicates over a network infrastructure 104, such as the Internet, with multiple communication devices 106, 108. The communication devices include network traffic devices 106, such as access points or routers, and client devices 108, such as laptop computers, desktop computers, and portable computing devices, all of which are capable of communicating with each other using a network communications protocol specification. In FIG. 1, particular communication devices 106, 108 are designated with a letter suffix ("a", "b", etc.). Particular devices will be referenced by their respective suffix 106a, 106b, 106c and 108a, 108b, . . . , 108f. References to the devices 106, 108 without their particular suffix will be understood to be a reference to the group collectively.

All of the devices 106, 108 are capable of communicating with each other over a wireless network communications protocol specification, such as the 802.11x family specification of the IEEE, also referred to as "wireless broadband" or "WiFi". The devices 106, 108 define a managed network 110 whose member devices communicate with the host computer 102, also referred to as the backend server. The managed network 110 includes component local mesh networks that are identified with a letter suffix ("a" or "b") so that references to the local networks without their suffix are references to the local networks collectively as the managed network. When it is necessary to refer to a particular local network 110a, 110b, the suffix identifier will be used.

The traffic devices 106 in FIG. 1 that are designated as gateways 106a, 106c serve as an interface between the WAN (Internet) 104 and their respective local wireless mesh networks 110a, 110b. FIG. 1 shows each gateway as having an interface device 111 interposed between itself and the Internet 104. That is, the interface device is upstream of the gateway. Those skilled in the art will understand details of such devices, which may comprise cable modems, DSL interfaces, and the like. Alternatively, the interface may be incorporated into the gateway device rather than being a separate component. Each gateway provides an interface between its respective mesh network and the Internet. For example, the gateway 106a is the Internet interface for the mesh network 110a comprising 106a and client 108c, client 108d, client 108e, and client 108f. The gateway 106b is the Internet interface for the mesh network 110b comprising gateway 106b, node 106c, client 108a, and client 108b. The gateways 106a, 106b communicate with the host 102 of the managed network and perform network address translation (NAT) functions for the devices 106, 108 within their respective managed networks 110a, 110b.

The mesh network 110 is operated under the control of a network owner 112, who can access management tools through a network portal interface of the host 102. Therefore, the network owner 112 is illustrated in FIG. 1 as being connected to the Internet 104, whereby the network owner using a computer or similar device can access a Web portal at the host 102 via a conventional Web browser. For the discussion herein, a reference to a "managed network" will be understood to be a reference to a local network having network traffic devices that operate according to the description and drawings herein under management of a network owner 112 through a service portal of the host 102.

The gateway devices 106a, 106b are also capable of network communications via a wired connection, such as Ethernet. The clients 108 can also have this dual capability. Thus, the managed networks 110a, 110b can include devices that are capable of communicating over both wired connections and wireless connections. In this discussion, the traffic devices 106 will also be referred to as routers or nodes of the managed networks. Thus, nodes as used herein comprise devices that can communicate over the managed networks 110 and can send data messages from other nodes toward destinations outside of the managed network, such as over the Internet 104 toward the host 102.

FIG. 1 shows that the network traffic devices (nodes) 106 can be provided with the ability to communicate with external networks that are outside of any of the managed networks 110. Thus, a dotted line represents a connection from the second gateway 106b to an external network 120. The external connection between the two 106b, 120 can comprise a wired connection or a wireless connection. The external network can comprise a connection to the Internet or a local network that does not share the client addressing scheme of the managed networks 110a, 110b and therefore comprises a heterogeneous network relative to the managed networks.

In FIG. 1, the network traffic device corresponding to the gateway 106b is shown with a connection to an external network 120 through which the gateway 106b can forward packets received from the clients 108a, 108b of its mesh network 110b to the uplinked external network 120. Therefore, the gateway 106b is acting as a bridge from the managed network 110b to the uplink external network 120 and performs a network address translation (NAT) function for the managed network relative to the uplinked network. The connection from the managed network gateway 106b to the external network 120 can be either a wireless connection or a wired (Ethernet) connection. Any one of the traffic devices 106 constructed in accordance with the invention can perform the uplink function, as described more fully below, including the gateway devices 106*a*, 106*b* and the node 106*c*. That is, all of the traffic devices 106*a*, 106*b*, 106*c* have a similar construction and therefore have similar operational capabilities.

FIG. 2 is a screenshot representation of a management tool comprising a node page, through which the network owner 112 can view information that describes the gateways 106 and clients 108 that are part of the mesh network 110. In accordance with the management tools, the network owner can operate the mesh network as an open network, meaning that any client device within the geographic coverage of the network 110 will be permitted to gain access. Alternatively, the network owner can operate the mesh network 110 as a closed network, such that a client device must be an authorized user before any of the gateways 106 will permit network access. The management tool thereby provides the FIG. 2 screenshot, which the network owner can view through a browser display upon pointing the network owner browser to the Web page of the network host 102. FIG. 2 shows that the information that can be viewed by the network owner with the management tool includes a node list view for the owner's network that shows a table of owned nodes, with additional columns for node name, hardware address, freshness (last activity), gateway ID, route metric, latency, throughput, and usage.

Figure 3:
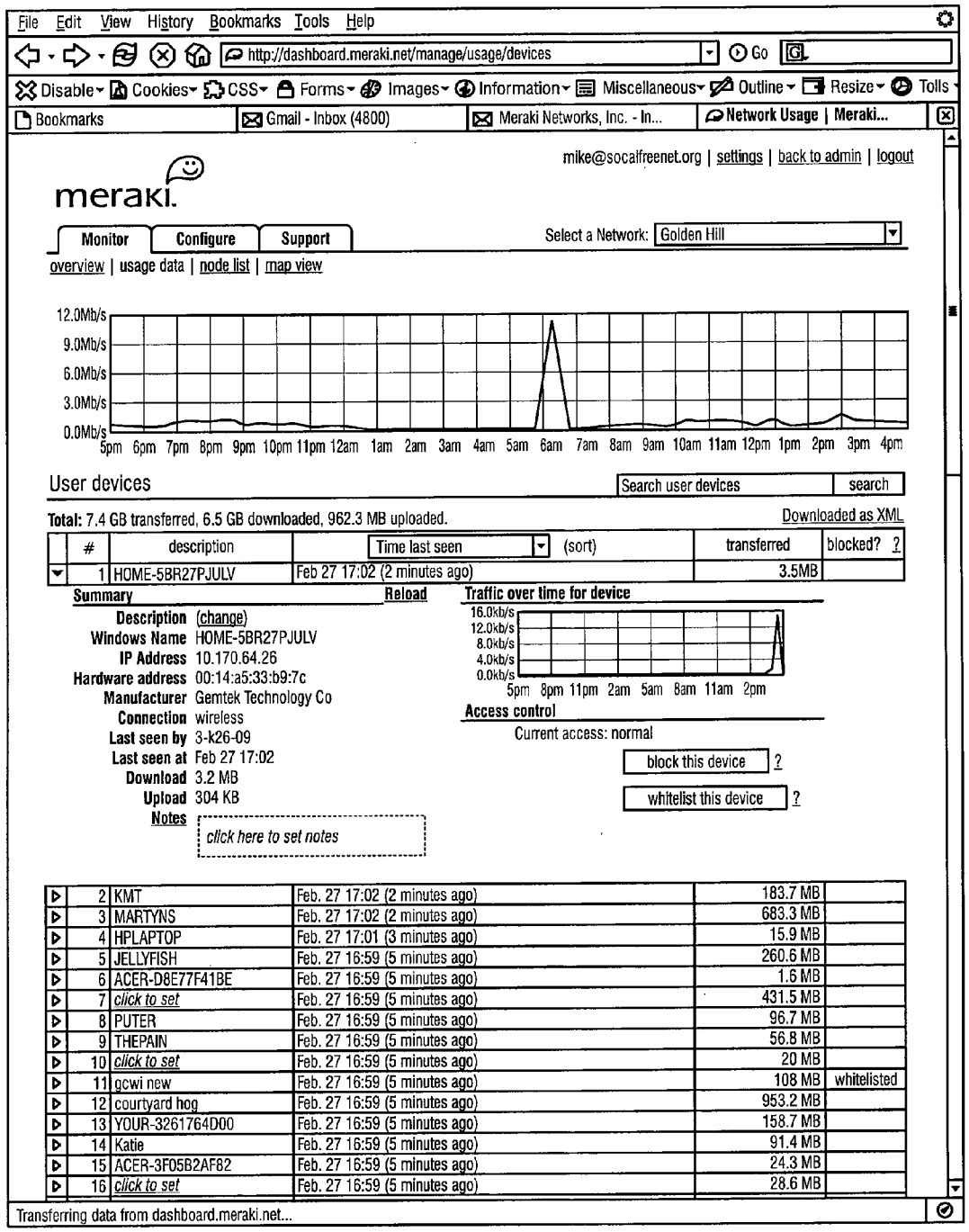
FIG. 3 is a management tool screenshot of a network usage screen provided by the host.

FIG. 3 shows a screenshot of another one of the management tools, comprising a network usage screen, in which the network 112 owner can view information relating to bandwidth usage over the mesh network 110. The time over which such information is displayed can be selected by the network owner, and can extend back to the first self-configuration operation from a gateway device of the mesh network 110, described further below.

Figure 4:
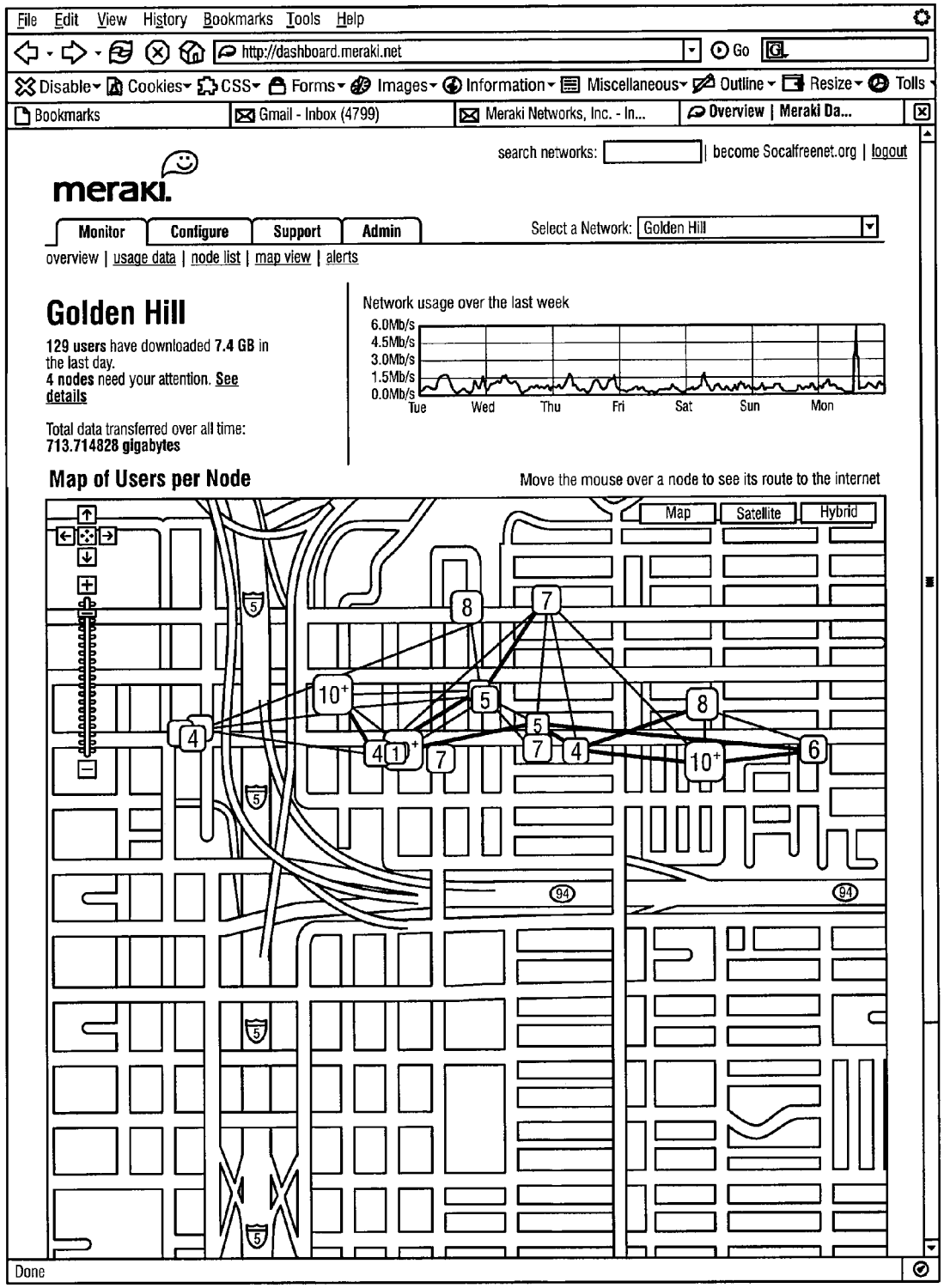
FIG. 4 is a management tool screenshot of a network map view provided by the host.

FIG. 4 is a screenshot of another management tool, comprising a network map view that shows a map display on which are superimposed markers that indicate geographic locations of the gateways 106. Active clients 108 can also be indicated on the map display. The map display can be retrieved from, for example, conventionally available map display services such as Mapquest, "Google Maps", and "Yahoo! Maps". The geographic locations of the gateways can be obtained from configuration information received upon registration of the gateways. For example, registration may require the network owner to provide the street address of the intended gateway location. From the received street address, one of the map display services can be used to obtain the corresponding geographical location. Alternatively, the gateways themselves could be provided with location-determining components, such as GPS-based mechanisms and the like.

Figure 5:
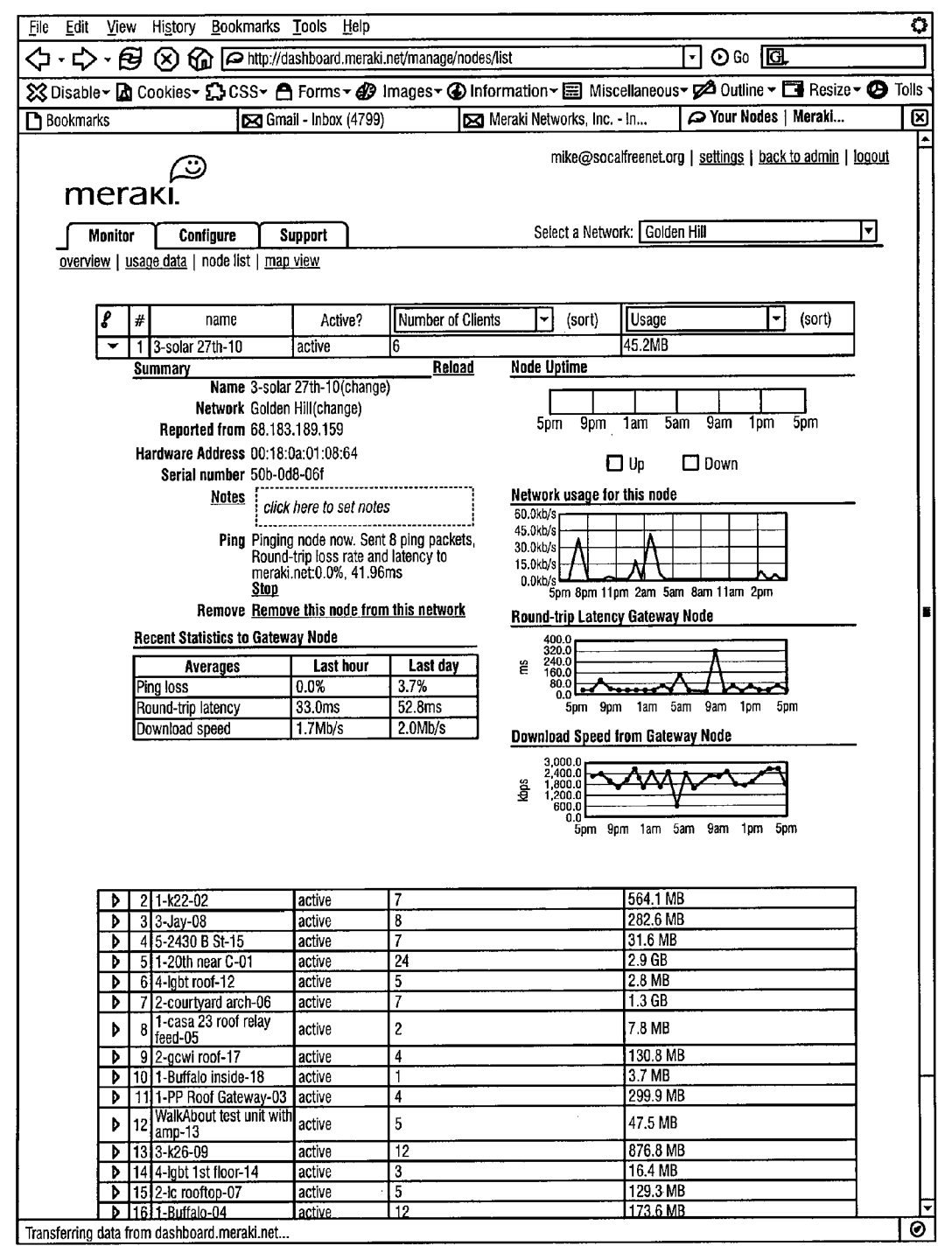

FIG. 5 is a screenshot of a management tool comprising a "dashboard" view of the mesh network 110. The dashboard view shows a combination of informative displays, such as network usage, status of the mesh network, status of users, client account status, network account status, and network configuration information and network settings. For example, the network usage information can include some or all of the information illustrated in the FIG. 3 network usage screenshot. The network status can include information about which gateways are active and which gateways are experiencing problems. The user status can indicate users who are currently online at the time of viewing the screen and can indicate account status of users, if applicable. The network account status information can be used by the network owner for checking account status of the network owner. Configuration information and settings shows information regarding configuration of the devices 106, 108 comprising the network 110.

Figure 6:
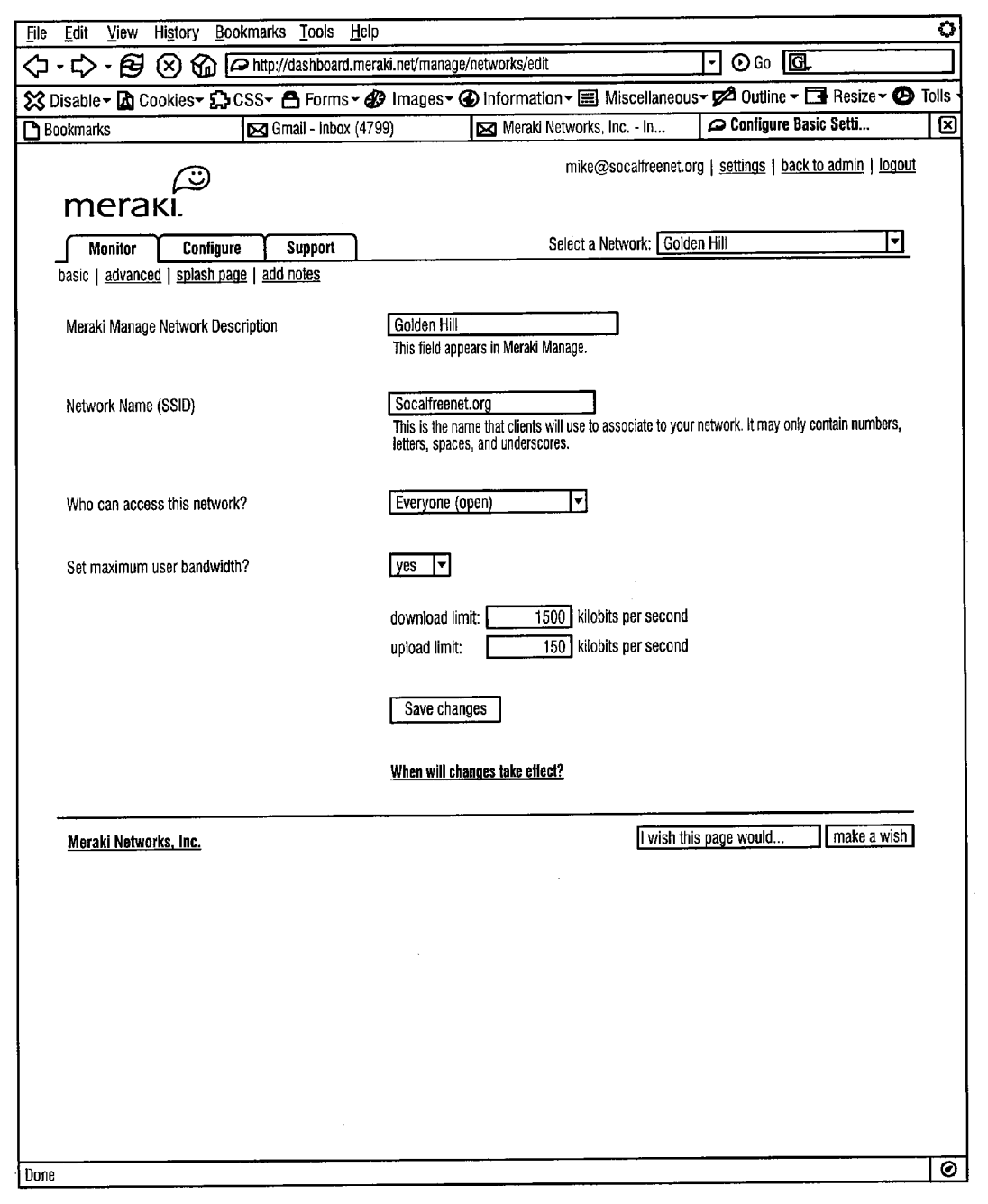

FIG. 6 shows a management tool screenshot of a configuration page by the host 102. The configuration page permits the network owner to enter configuration information and settings for the mesh network 110 that will be controlled and managed by the network owner. The screenshot shows that various display pages can be selected via tabs corresponding to configure, access control, splash page, alerts, and any blocked user (client) devices.

Figure 7:
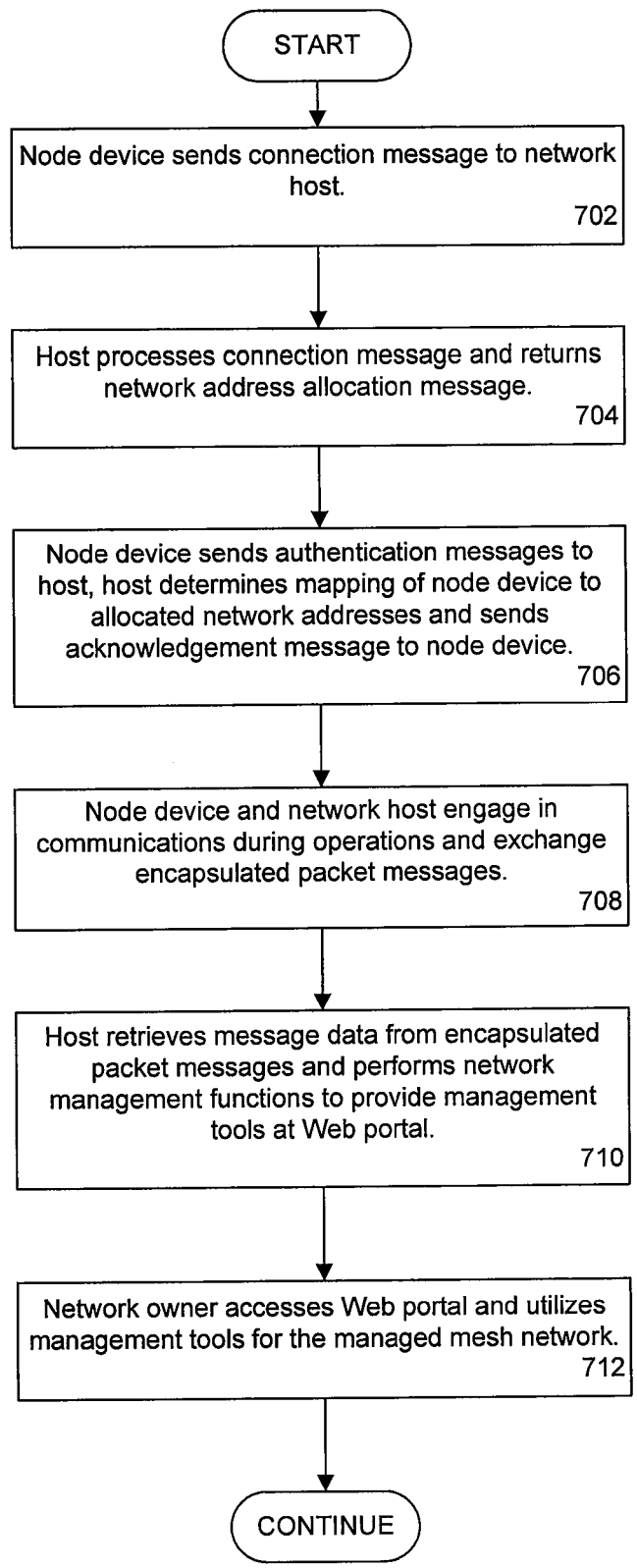
FIG. 7 is a flowchart that illustrates processing in the FIG. 1 system to provide network management in accordance with the invention.

FIG. 7 is a flowchart that illustrates operation of the network 100 in accordance with the invention. As described further below, the node device upon start up carries out operations that comprise self-configuration processing, by which a node device becomes part of the mesh network 110 (see FIG. 1). In the first operation, represented by the flow diagram box numbered 702, the network host receives a connection message from a node device. The node device can comprise one of the gateways or one of the clients. The connection message comprises a request from the node device for a network address in the managed network 110. At box 704, the host determines if the requesting node device is associated with device registration data in the managed network that identifies a network owner and, if the requesting node device is a registered device, then the host returns a network address allocation message to the requesting node device. This operation completes a self-configuring process of the node device for communications with the network host and establishes the hosted network associated with the identified network owner.

At box 706, the host periodically receives authentication messages from the node device such that the network host can determine a mapping of the network address to the registered device, and responds to the authentication message with an acknowledgement message. The acknowledgement message maintains a persistent network connection path from the network host to the node device. At box 708, the network host and node device participate in sending and receiving encapsulated packet messages, the encapsulated packet messages comprising packet messages of the message protocol appended with header information of the hosted network. The network host, at box 710, retrieves message data from encapsulated packet messages it receives from the node device and performs network management operations to provide the management tools. As noted above, the management tools are provided via a user management interface such as a Web portal that is accessed by the identified network owner through a conventional Web browser. At box 712, the network owner accesses the network management tools via the Web portal that is provided by the host. The management tools includes the information provided by the screenshots illustrated in FIGS. 2-6.

Other features of the system 100 are described by the description below, which provides additional details of the self-configuration processing and associated communications.

Upon startup, a node device can either configure itself as a gateway via a wired connection to the Internet, or the node device can join an existing network of nodes and communicate with the nodes in the network via multi-hop forwarding. To automatically configure itself, a node must perform the following high-level tasks: (1) determine whether it is a gateway (via a DHCP request), (2) perform a scan via wireless communication to discover surrounding access points, (3) use the results from the scan to determine the node's behavior as a gateway or to determine which existing network to join, and (4) derive an IP address to be used within the mesh network 110.

Initially, a node device must determine whether it should behave as a gateway or join an existing network. To do so, the node device must (1) initialize its Ethernet interface through a wired connection, or (2) attempt to obtain an IP address (used to address the node outside of the mesh) by broadcasting its MAC address (hardware ID) in a DHCP request over Ethernet. If the node device is connected to the Internet, a DHCP server will respond with a valid IP assignment, ensuring that there are no address assignment collisions. The node will attempt to renew its DHCP lease periodically by confirming the validity of its IP with the DHCP server. Once the node has obtained an IP address from the DHCP server, it adjusts its state to operate as a gateway.

If the node device receives no response from a DHCP server after a short timeout (e.g. 20 sec), it performs a scan for surrounding wireless access points and attempts to join an existing network. The node periodically issues DHCP requests as a background task. If the node receives a DHCP response as a result, it adjusts its state to operate as a gateway. If the node acting as a gateway fails to renew its DHCP lease, it takes down its wireless interface (that is, it ceases to operate as a gateway), and scans for a network to join.

If the node successfully configures itself as a gateway, then the node determines its channel of operation and adjusts its behavior. The node first scans for surrounding wireless access points to see which channels are in use, then chooses its channel of operation. Thereafter, the node periodically broadcasts messages with a special code to indicate that it is acting as a gateway. In the illustrated embodiment, a 'IS_GW' (gateway) bit in an encapsulated message is set.

To perform a scan, a node builds a list of surrounding wireless access points by scanning each wireless channel and aggregates responses from access points operating on each channel. If the node is a gateway, it will use the list to determine its channel of operation. If the node is looking to join an existing network, it will use the list to determine the best existing network and join it. A node performs its initial scan by scanning each channel twice (20-40 ms per channel), and performs periodic scans at predetermined intervals (such as every 10-15 secs) thereafter. To perform a scan request, a node broadcasts an 802.11 management probe request, with the SSID in the payload set to zero. The probe request packet has a message configuration that includes an 802.11 header, a type field for the network 100, a subtype field, an SSID field, and a bit rate field. The type field indicates a management message. The subtype indicates a management probe request. The SSID is set to zero, so that any nearby access points will respond to the probe request message.

In response to the scan message, any nearby access point will provide a management probe response that includes TLV (type, length, value) elements in the probe response payload. The TLV elements contain specific information about whether the respondent is a node of the hosted network.

The node devices also build a list of access points that make up the mesh network. A node device builds a list of nearby access points with an identifier corresponding to the network 110 as a result of its wireless scans on each channel. The list tracks the following properties of each neighboring access point: MAC Address, SSID, SNR in both directions (e.g. when a node A issues a probe request received by node B, the node B includes the A-to-B SNR in its probe response; node A then receives node B's probe response, thus node A also knows the B-to-A SNR), an IS_GW field, an IS_MERAKI field, a gateway metric value. The IS_GW field indicates if the device is functioning as a gateway, and the IS_MERAKI field indicates if the device is a member of the mesh network 110.

If a node is not a gateway, it uses the list of available access points from its scans to choose the network with the best performance heuristic and joins it. To determine the network to join, the node device will (1) filter the list of access points based on a threshold Signal-to-Noise ratio, (2) sort the filtered list of access points by Gateway metric, (3) Choose the operating channel (e.g. the channel of the access point with the best Gateway metric), (4) Join the mesh network by operating on the selected channel, and broadcast the node's own SSID to find its neighbors.

The system 100 also provides a hash-based network address allocation, by which the system can use multiple network uplinks and still maintain seamless client roaming with zero-configuration. The network uses an automatic address allocation system, where all devices hash their hardware MAC address to derive their network (IP) address. These network addresses lie in an unallocated/reserved Class A address space, and each of the network gateways performs network address translation (NAT) to map their single uplink IP address to the address space of the network 100. This construction provides beneficial characteristics. First, heterogeneous network uplinks can be used within in a single mesh network, because IP addresses are assigned consistently regardless of external addresses. The set of network uplinks can even change without requiring address re-allocation. Secondly, client devices can freely roam within the network (and can switch between network uplinks) without needing to renew their IP addresses. The network automatically determines which network uplink to use for a given connection, and automatically updates routing tables as clients move through a network. Thirdly, because there is no DHCP server for address allocation, there is no single source of failure for address allocation.

These considerations will be more clearly understood in conjunction with the following brief example. Imagine a mesh network with two network uplinks, a cable and a DSL modem. The cable modem's IP address is 1.1.1.1, and the DSL modem's address is 2.2.2.2. Each device in the managed network 100 has an IP addresses in the of the form 127.x.x.x, where x.x.x is a result of a 24-bit hash function over the device's MAC address (e.g. 00:11:22:33:44:55→127.13.55.212). Routers in the managed network derive addresses the same way, so the cable modem can fail or switch addresses without affecting the mesh.

Other systems are known that use a scheme in which mesh routers' IP addresses are the bottom 24-bits of their hardware MAC address. See, for example, the Roofnet project at the Massachusetts Institute of Technology. However, in such systems, client devices are assigned addresses through a DHCP server, so the client devices cannot freely roam within the network, and the lack of hash function leads to more frequent address collisions. Thus, the system of the present invention supports multiple heterogeneous uplinks.

The managed network 100 also provides pull-based network monitoring, whereby all of the routers in the network report statistics back to the host, so network telemetry can be presented to users (network owners) via a Web-hosted management interface. The node devices do this by establishing persistent VPN tunnels back to the host over IP, which can penetrate NATs and firewalls because they are outbound towards the host (instead of the host trying to connect into a network).

The pull-based network monitoring supports novel statistics gathering operations. Rather than having the node devices proactively report statistics at predetermined intervals, such as every five minutes for example, the host will query the node devices for operational data. These queries can also contain code fragments for remote execution (e.g. initiate a firmware upgrade, reconfigure settings, etc.). The queries can also be performed in real-time, which makes the management interface provided by the host very responsive. This feature can be provided, for example, by node devices comprising routers in multiple networks worldwide establishing VPN tunnels, with the host querying the networks through the tunnels. Such a configuration offers real-time statistics about networks behind firewalls in a manner that is more extensible than SNMP techniques, so that information can be gathered without implementing trap handlers and the like.

Another feature of the network 100 is the ability to use another wireless network for a network uplink. In particular, a node device constructed in accordance with the present invention can attach to other wireless networks, and relay traffic through them, even if the other networks are not operating in accordance with interface through the host described herein. For example, a single node device such as a router or a network of routers as described herein can attach to a publicly available network, such as GoogleWiFi, and relay the network signal into homes and apartment buildings with clients. Currently available 802.11 range extenders require either extensions on the uplink network side (called WDS, or wireless distribution system) or they act as a single client and perform NAT for any devices behind the connection. The latter means connected clients all appear as a single IP address, which isn't suitable for many networks. Node devices in accordance with the present invention offer an alternative to WDS.

As noted above, the network 100 provides integrated management, monitoring and billing through a hosted back-end (the host described above). The network in accordance with the invention does not require the network owner to attend to installation of servers and does not require the network owner to run the services. The tight integration and the remote hosting are features that provide a convenient "ISP in a box" solution to the marketplace.

The network also provides streaming firmware upgrades, making the node devices field upgradeable, whereby they can receive software updates over wireless communication. The network provides a "streaming" approach to such central communications, wherein portions or blocks of the updates (such as firmware) are iteratively written to flash memory of the node devices, rather than requiring download of the entire update before writing to the flash memory. In this way, upgrades of large amounts of flash can be achieved with relatively little memory resources. For example, 8 MB of device flash memory can be upgraded while only using approximately 50 k of device RAM.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment described herein, the nodes that process network traffic are specified as operating with the Linux operating system. Those skilled in the art will appreciate that a wide variety of device operating systems other than Linux can provide a suitable environment for execution of the operations described herein. Thus, any computer device that can perform the operations described herein can be utilized in a managed network system constructed in accordance with the invention.

Figure 8:
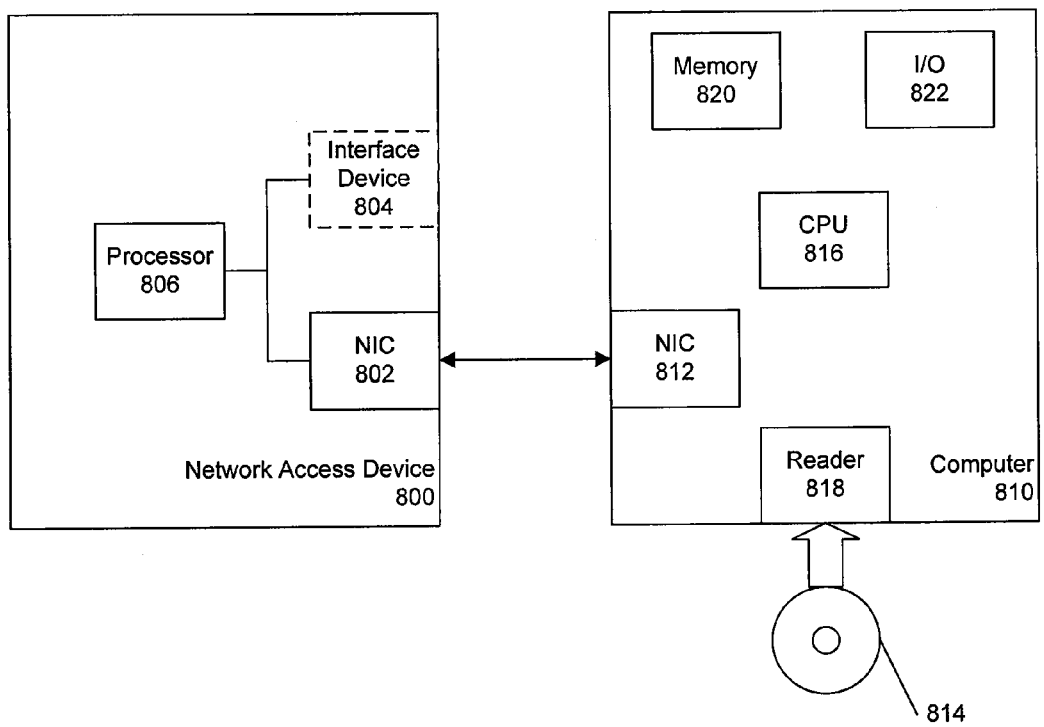
FIG. 8 is a block diagram that shows network devices constructed in accordance with the present invention.

FIG. 8 shows configurations for a network access device constructed in accordance with the present invention. A network access device for the managed network can comprise, for example, a wireless router or other access point for the managed network, or can comprise a personal computer or server device that operates as an access point. As noted above, such network access devices can operate as one of the gateway devices 106a, 106b, 106c illustrated in FIG. 1.

Two devices are illustrated in FIG. 8 that are capable of operation as gateways 106. One such device 800 in FIG. 8 comprises a wireless access point and includes a network communication interface 802 that permits communications with a network. The network interface can comprise a network interface card (NIC). The FIG. 8 device 800 includes an optional interface device 804 comprising a cable modem or DSL interface or the like. The interface device 804 is illustrated in dashed line to indicate that such capability is an optional component of the network access device 800, and to show that the interface device can be provided external to the network access device. The processor 806 of the device 800 comprises a computer processor chip and associated circuitry and related components, such as program memory, data memory, central processor unit, and the like. The processor 806 enables the device 800 to operate in accordance with the description herein via execution of appropriate program instructions.

The second device 810 illustrated in FIG. 8 that can operate as a gateway comprises a computer system such as a personal computer or server computer or the like. The computer 810 includes a network communication interface 812 that permits communications with a network. The network interface can comprise a network interface card (NIC).

The processor 806 of the access point 800 can receive program instructions for proper operation into the program memory of the processor. The program instructions can be received directly, such as by flashing EEPROM of the processor, or can be received through the network interface 802, such as by download from a connected device or over a WAN or LAN network communication. In the case of receiving program instructions through the network interface, the device 800 can be connected to the computer 810 that includes the program instructions in a suitable data file. If desired, the program instructions can be stored on a computer program product 814 that is read by the computer 810 so that the program instructions can thereafter be transferred to the device 800. That is, the program product 814 is for use in a computer system such as the computer 810, wherein the program product comprises a recordable media containing a program of computer-readable instructions that are executable by the device processor 804 to perform the operations described herein. The program instructions of the program product 814 can be transferred by the computer 810 to the device 800, whereupon the instructions can be executed by the device so as to operate in accordance with the methods and operations described herein. The program product 814 can comprise, for example, optical program media such as CD or DVD data discs, or flash memory drives, or external memory stores, or floppy magnetic disks, and the like. The computer 810 includes a central processor 816 and a program product reader 818 for receiving the program product media and reading the program instructions. The computer also includes associated memory 820 and input/output facilities 822, such as a display and keyboard.

Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art. The programming such as firmware and application software for the operations described herein can be installed through conventional manufacturing and production processes and through typical program installation techniques for computer devices. For example, the programming can be installed from program media containing machine instructions that can be read from media such as CD or DVD optical disc devices such that when the instructions are executed by the computer device they will cause operation in accordance with the techniques described herein. Other sources of such programming include external program sources such as memory chips, floppy disks, thumb drives, flash memory, and the like that are received into reader devices such that the program instructions can be installed.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

We claim:

1. A method comprising:
   receiving, at a network host, a request from a node device for a network address, wherein the node device is one of a plurality of node devices in a managed network;
   determining that the node device is associated with device registration data in the managed network that identifies a network owner of the managed network;
   returning a network address allocation message to the node device based on the device registration data, the network address allocation message for use in configuring the node device for operation in the managed network;
   establishing, based on the network allocation message, a persistent Virtual Private Network (VPN) tunnel between the network host and the node device;
   maintaining the persistent VPN tunnel between the network host and the node device for exchanging network messages; and
   performing, by the network host, pull-based network monitoring to provide a user management interface to the network owner for managing the plurality of node devices, wherein the network host sends a query message to the node device using the persistent VPN tunnel, retrieves operational data from a query response from the node device, and provides real-time updates to the user management interface in accordance with the operational data from the node device, wherein different ones of the plurality of node devices are part of different ones of local networks associated with the network owner.

2. The method of claim 1, wherein maintaining the persistent VPN tunnel comprises:
   receiving periodic authentication messages from the node device at the network host; and
   responding to the authentication message with an acknowledgment message.

3. The method of claim 1, further comprising:
   providing the user management interface to the network owner via a portal accessed over a wide area network.

4. The method of claim 1, wherein the node device is one of a router, a gateway device, and a wireless access point.

5. The method of claim 1, wherein the node device is a gateway device configured to provide network address translation for a plurality of client devices located on a local area network.

6. The method of claim 1, further comprising:
   sending and receiving encapsulated packet messages between the network host and the node device, the encapsulated packet messages comprising packet messages of a message protocol appended with header information associated with the managed network.

7. A network host comprising:
   one or more computer processors; and
   a memory storing instructions that, when executed by the one or more computer processors, cause the network host to:
   receive a request from a node device for a network address, wherein the node device is one of a plurality of node devices in a managed network;
   determine that the node device is associated with device registration data in the managed network that identifies a network owner of the managed network;
   return a network address allocation message to the node device based on the device registration data, the network address allocation message for use in configuring the node device for operation in the managed network;
   establish, based on the network allocation message, a persistent Virtual Private Network (VPN) tunnel between the network host and the node device;
   maintain the persistent VPN tunnel between the network host and the node device for exchanging network messages; and
   perform pull-based network monitoring to provide a user management interface to the network owner for managing the plurality of node devices, wherein the network host sends a query message to the node device using the persistent VPN tunnel, retrieves operational data from a query response from the node device, and provides real-time updates to the user management interface in accordance with the operational data from the node device, wherein different ones of the plurality of node devices are part of different ones of local networks associated with the network owner.

8. The network host of claim 7, wherein maintaining the persistent VPN tunnel comprises:
   receiving periodic authentication messages from the node device at the network host; and responding to the authentication message with an acknowledgment message.

9. The network host of claim 7, wherein the instructions further cause the network host to:
provide the user management interface to the network owner via a portal accessed over a wide area network.

10. The network host of claim 7, wherein the node device is one of a router, a gateway device, and a wireless access point.

11. The network host of claim 7, wherein the node device is a gateway device configured to provide network address translation for a plurality of client devices located on a local area network.

12. The network host of claim 7, wherein the instructions further cause the network device to:
send and receive encapsulated packet messages between the network host and the node device, the encapsulated packet messages comprising packet messages of a message protocol appended with header information associated with the managed network.

13. A non-transitory computer-readable medium storing instructions that, when executed by a network host, cause the network host to:
receive a request from a node device for a network address, wherein the node device is one of a plurality of node devices in a managed network;
determine that the node device is associated with device registration data in the managed network that identifies a network owner of the managed network;
return a network address allocation message to the node device based on the device registration data, the network address allocation message for use in configuring the node device for operation in the managed network;
establish, based on the network allocation message, a persistent Virtual Private Network (VPN) tunnel between the network host and the node device;
maintain the persistent VPN tunnel between the network host and the node device for exchanging network messages; and
perform pull-based network monitoring to provide a user management interface to the network owner for managing the plurality of node devices, wherein the network host sends a query message to the node device using the persistent VPN tunnel, retrieves operational data from a query response from the node device, and provides real-time updates to the user management interface in accordance with the operational data from the node device, wherein different ones of the plurality of node devices are part of different ones of local networks associated with the network owner.

14. The non-transitory computer-readable medium of claim 13, wherein maintaining the persistent VPN tunnel comprises:
receiving periodic authentication messages from the node device at the network host; and
responding to the authentication message with an acknowledgment message.

15. The non-transitory computer-readable medium of claim 13, wherein the instructions further cause the network host to:
provide the user management interface to the network owner via a portal accessed over a wide area network.

16. The non-transitory computer-readable medium of claim 13, wherein the node device is one of a router, a gateway device, and a wireless access point.

17. The non-transitory computer-readable medium of claim 13, wherein the node device is a gateway device configured to provide network address translation for a plurality of client devices located on a local area network.

* * * * *